United States Patent [19]
Bosa et al.

[11] Patent Number: 6,115,362
[45] Date of Patent: Sep. 5, 2000

[54] METHOD AND APPARATUS FOR DETERMINING FRAME RELAY CONNECTIONS

[75] Inventors: Patrick A. Bosa, Exeter; Gregory E. Mayo, Salem; Christopher Crowell, East Hampstead, all of N.H.

[73] Assignee: Cabletron Systems, Inc., Rochester, N.H.

[21] Appl. No.: 08/827,541

[22] Filed: Mar. 28, 1997

[51] Int. Cl.[7] .................. G01R 31/08; G06F 11/00; G08C 15/00; H04J 1/16
[52] U.S. Cl. .................. 370/248; 370/232; 370/242
[58] Field of Search .................. 370/395, 396, 370/399, 400, 401, 407, 408, 409, 419, 431, 464, 252, 248, 251, 253, 254, 359, 360, 402, 406, 437, 465, 230, 232, 233, 234, 235, 242, 244, 247, 250

[56] References Cited

U.S. PATENT DOCUMENTS

| | | | |
|---|---|---|---|
| 5,261,044 | 11/1993 | Dey et al. | 395/159 |
| 5,315,580 | 5/1994 | Phaal | 370/401 |
| 5,408,469 | 4/1995 | Opher et al. | 370/401 |
| 5,450,408 | 9/1995 | Phaal | 370/85.13 |
| 5,533,007 | 7/1996 | Orita et al. | 370/252 |
| 5,661,722 | 8/1997 | Miyagi | 370/395 |
| 5,689,512 | 11/1997 | Bitz et al. | 370/401 |
| 5,694,394 | 12/1997 | Shinohara | 370/401 |
| 5,710,885 | 1/1998 | Bondi | 395/200.54 |
| 5,751,933 | 5/1998 | Dev et al. | 395/182.02 |
| 5,751,965 | 5/1998 | Mayo et al. | 395/200.54 |
| 5,768,501 | 6/1998 | Lewis | 714/4 |
| 5,809,286 | 9/1998 | McLain, Jr. et al. | 395/500.44 |
| 5,825,772 | 10/1998 | Dobbins et al. | 370/401 |
| 5,867,483 | 2/1999 | Ennis, Jr. et al. | 370/252 |
| 5,872,928 | 2/1999 | Lewis et al. | 709/222 |
| 5,898,674 | 4/1999 | Mawhinney et al. | 370/251 |

FOREIGN PATENT DOCUMENTS

| | | |
|---|---|---|
| 0455402 A2 | 6/1991 | European Pat. Off. . |
| WO 95/06989 | 9/1995 | WIPO . |

OTHER PUBLICATIONS

Muller, N.J., "The Management Aspects of Frame Relay," International Journal of Network Management, vol. 2, No. 2, Jun. 1992, pp. 87–99, XP002052342.

C. Brown et al., "Management Information Base For Frame Relay DTES," Network Working Group Request For Comments: 1315, Apr. 1992.

Primary Examiner—Douglas W. Olms
Assistant Examiner—Phirin Sam
Attorney, Agent, or Firm—Wolf, Greenfield & Sacks, P.C.

[57] ABSTRACT

A system determines that a frame relay connection exists between an interface on a first interface device and an interface on a second interface device, for example by comparing addresses resident in routing tables of the interface devices. The system then queries each of the first and second interface devices, to determine the amount of traffic that is communicated by each channel of each of the two interfaces. This data is then correlated to determine the relative amount of data by each channel on each of the two interfaces, and the pair of channels having the best correlation are determined to represent an actual connection.

26 Claims, 7 Drawing Sheets

| IfIndex | DLCI | OutFrames-t0 | InFrames-t0 | OutFrames-t1 | InFrames-t1 | DeltaOut | DeltaIn |
|---|---|---|---|---|---|---|---|
| 9 | 31 | 1,215,647 | 6,894,341 | 1,264,893 | 6,921,004 | 49,246 | 26,663 |
| 9 | 103 | 32,423,675 | 37,654,687 | 32,498,011 | 37,721,956 | 74,336 | 67,269 |
| 9 | 351 | 6,745,234 | 112,435 | 6,772,156 | 112,435 | 26,922 | 0 |

FIG. 8

| IfIndex | DLCI | OutFrames-t0 | InFrames-t0 | OutFrames-t1 | InFrames-t1 | DeltaOut | DeltaIn |
|---|---|---|---|---|---|---|---|
| 4 | 40 | 14,342,552 | 8,553,341 | 14,356,689 | 8,554,067 | 14,137 | 726 |
| 4 | 56 | 6,943,698 | 1,284,577 | 6,970,541 | 1,333,8232 | 26,843 | 49.246 |

FIG. 9

|  | INTERFACE If 4 | |
|---|---|---|
|  | DLCI 40 | DLCI 56 |
| INTERFACE If9 — DLCI 31 | 32 | 99 |
| INTERFACE If9 — DLCI 103 | 19 | 70 |
| INTERFACE If9 — DLCI 351 | 4 | 52 |

FIG. 10

METHOD AND APPARATUS FOR DETERMINING FRAME RELAY CONNECTIONS

BACKGROUND OF THE INVENTION

1. Field of the Invention

The invention relates to frame relay communications, and more particularly to a method and apparatus for identifying on which channel a frame relay communication is made.

2. Discussion of the Related Art

Computer networks are widely used to provide increased computing power, sharing of resources and communication between users. One type of network is referred to as a frame relay network—it complies with an interface standard that provides statistical time division multiplexing and circuit switching, and is typically optimized for the transport of protocol-oriented data.

In a typical frame relay network, a communications carrier provides a designated data throughput between two particular entry points (sites) to the network. The data is passed through a "connection," which is also referred to as a "virtual circuit." A permanent virtual circuit (PVC) has one guaranteed data throughput, while a switched virtual circuit (SVC) allows additional throughput in response to a specific demand. Each connection (i.e., virtual circuit) is identified by a data link connection identifier or index (DLCI) number. Many DLCI numbers have local significance only, i.e., a connection identified by a first DLCI number at a first site, may be identified by a different DLCI number at a second site. The connection may be implemented via a set data path, or the data may be re-routed through a different data path depending upon circuit performance. Additional detail on frame relay architectures, protocols, and analysis is described in *Analyzing Broadband Networks,* Mark A. Miller, M&T Books, pp. 31–169 (1994), which is hereby incorporated by reference.

In the operation and maintenance of computer networks, a number of issues arise including traffic overload on various parts of the network, optimum placement and interconnection of network resources, security, isolation of network faults, and the like. These issues become increasingly complex and difficult to understand and manage as the network becomes larger and more complex. For example, if a network device is not sending messages, it may be difficult to determine whether the fault is with the device itself, a data communication link, or an intermediate network device between the sending and receiving devices.

Network management systems have been developed to resolve such issues. Older systems typically operated by collecting large volumes of information, which then required evaluation by a network administrator; this placed a tremendous burden on, and required a highly-skilled network administrator. Newer network management platforms systematize the knowledge of the networking expert such that common problems can be detected, isolated and repaired, either automatically or with the involvement of less-skilled personnel. Such a system typically includes a graphical representation of that portion of the network being monitored by the system. An example of the newer automated system is the Spectrum™ network management platform available from Cabletron Systems, Inc., Rochester, N.H. USA.

It would be desirable to provide a network management system that can determine and display a graphical representation of particular connections which exist in a frame relay network. However, a single interface device, such as a router, switch, or bridge, may have several interfaces, each of which communicates with the frame relay network. Additionally, each interface may communicate over several distinct frame relay connections. Still further, each interface device may not have specific knowledge regarding the other interface device(s) with which it is communicating, much less the specific virtual circuits (connections) that exist at any given time. Accordingly, it would be desirable to be able to determine particular connections from data which is available from the interface devices.

SUMMARY OF THE INVENTION

According to one embodiment of the present invention, a network management system is provided which determines that a frame relay connection is coupled between a first interface on a first interface device and a second interface on a second interface device, for example by comparing addresses which reside in routing tables of the first and second interface devices. The system queries the management information base (MIB) of each of the first and second interface devices, to determine the amount of traffic that is communicated by each channel of the two interfaces. This data is then correlated to determine a relative amount of data transmitted on each channel of the two interfaces, and the two channels having the best correlation are determined to represent a particular connection.

According to a method embodiment of the invention, a method is provided for identifying a connection in a frame relay network. The method comprises the steps of identifying a first plurality of channels of a first interface and a second plurality of channels of a second interface that potentially relate to a frame relay connection, and then selecting, as an identifier for the frame relay connection, a first channel from the first plurality of channels and a second channel from the second plurality of channels based upon a relative amount of data transferred on each of the first and second channels.

Yet another apparatus embodiment includes a data module and a results analyzer. The data module is coupled to a frame relay network and has an output that provides an indication of a first plurality of channels and a second plurality of channels that potentially relate to a frame relay connection, and the results analyzer selects a first channel from the first plurality of channels and a second channel from the second plurality of channels based upon a relative amount of data transferred on each of the first and second channels, in order to identify the frame relay connection.

In any of these embodiments, a plurality of correlation factors may be determined, for example by a statistics module, for each potential pair of channels. The correlation factor having a best (e.g., highest) value may be used to determine which of the plurality of potential pairs of channels has the best (e.g., highest) correlation factor. A correlation factor may be related to a similarity between an amount of data transmitted by a first channel and an amount of data received by a second channel during a period of time.

In any of these embodiments, a first interface device may be queried to determine an amount of data that has been transferred by one channel as of a first time, and the first interface device queried again to determine an amount of data that has been transferred by the one channel as of a second time, wherein the amount of data being transferred is determined to be the difference between these two amounts. A similar set of queries and difference determination may be made for a second interface of the potential pair.

In accordance with at least one embodiment, a determination may be made that a connection exists between an interface of a first interface device and an interface of a second interface device by comparing an address of the first interface with a destination address of data transmitted by the second interface.

These and other features and benefits of the present invention will be more particularly described in the following detailed description.

BRIEF DESCRIPTION OF THE DRAWINGS

FIG. 8 is an example of a traffic table, for data such as that shown in FIG. 3, wherein the data relates to a first interface;

FIG. 9 is an example of a traffic table, for data that relates to a second interface; and FIG. 10 is an example of a correlation matrix for the data that is shown in FIG. 3.

DETAILED DESCRIPTION

Aspects of the present invention will be described in conjunction with the use of a model-based network management system, such as Spectrum™, which is described in U.S. Pat. No. 5,261,044, issued Nov. 9, 1993 to R. Dev et al., and hereby incorporated by reference in its entirety. The Spectrum™ network management system is commercially available and described in various user manuals and literature available from Cabletron Systems, Inc., 35 Industrial Way, Rochester, N.H. 03867.

Other commercially available network management systems and related applications include: HP OpenView, Hewlett Packard Corp., 3000 Hanover Street, Palo Alto, Calif. 94304; LattisNet, Bay Networks, 4401 Great American Pkwy., Santa Clara, Calif. 95054; IBM Netview/6000, IBM Corp., Old Orchard Road, Armonk, N.Y. 10504; and SunNet Manager, SunConnect, 2550 Garcia Ave, Mountain View, Calif. 94043. Embodiments of the invention described herein may be applicable to such other network management systems or portion thereof.

Figure 1:
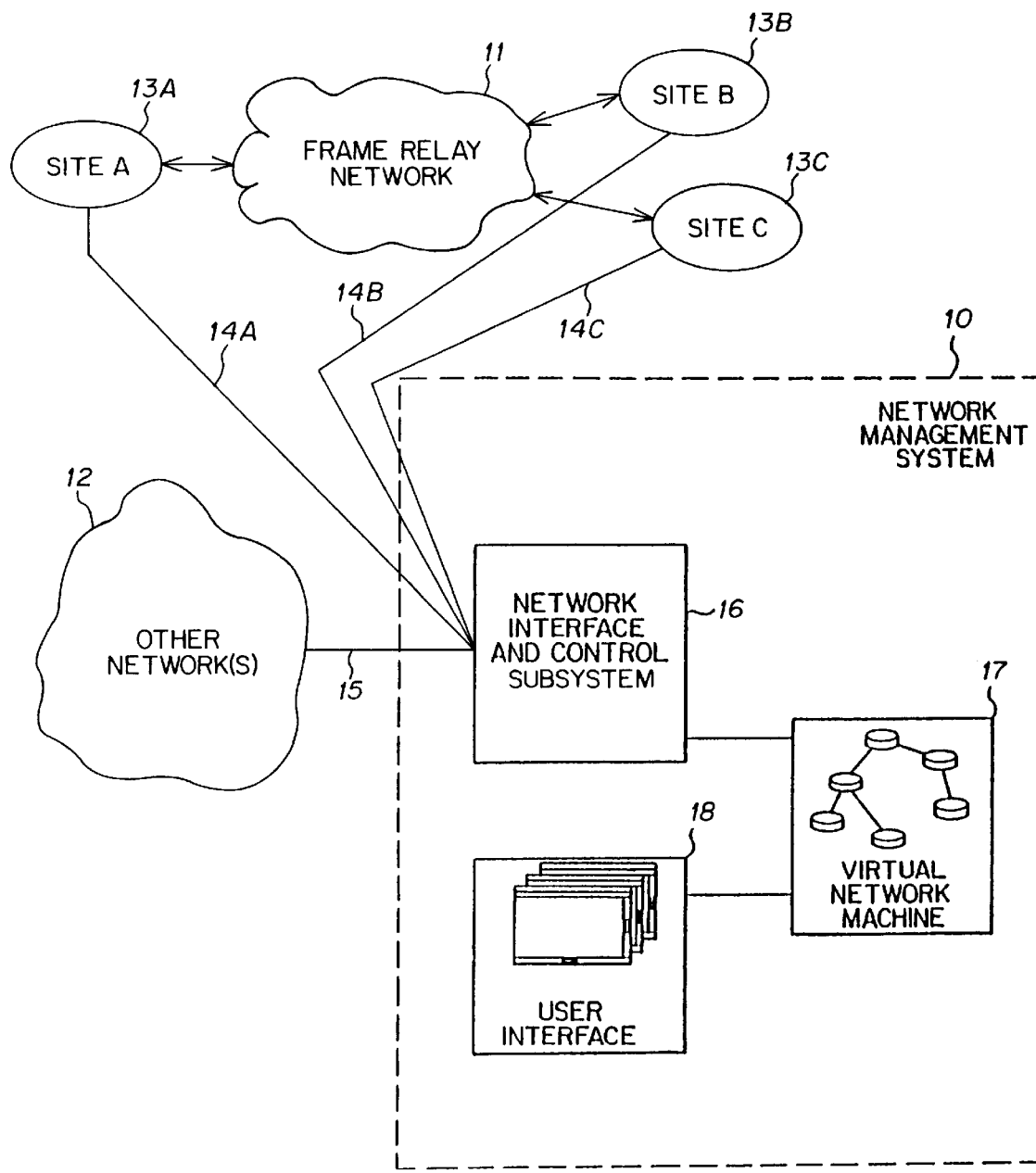
FIG. 1 is a schematic diagram of a network management system that interfaces with elements of a frame relay network.

FIG. 1 shows a network management system 10 that monitors a frame relay network 11 and other network(s) 12. The other network(s) 12 may be other frame relay networks, or other types of networks, e.g., ethernet, token ring, FDDI, etc. The frame relay network 11 is illustrated as connecting three different sites 13 that communicate across the frame relay network—site A (13A), site B (13B), and site C (13C). The network management system 10 monitors the frame relay network 11 by communicating with devices within each of the sites 13A–C. Each device within the sites 13A–C is referred to herein as an "interface device."

FIG. 1 shows one embodiment of the network management system 10, including a network interface and control subsystem 16, a virtual network machine 17, and a user interface 18. The virtual network machine 17 is coupled to both the network interface and control subsystem 16 and the user interface 18. The network interface and control subsystem 16 is coupled to each of the frame relay sites 13A–C by a corresponding one of communication paths 14A–C, and is coupled to the other network(s) 12 by communication path 15. The communication paths 14A–C and 15 may be actual connections, or may represent a virtual access to data that relates to a particular site. For example, the network interface and control subsystem 16 may access a single data repository that stores data for all of the sites 13A–C, instead of directly accessing the interface devices on each site.

In one embodiment, the network management system 10 comprises a programmed digital computer, wherein a program is implemented using an object-oriented programming language such as C++, Eiffel, SmallTalk, and Ada. The virtual network machine 17 includes interrelated intelligent models (objects) of network entities and relations between network entities, including a capability for acquiring network data pertaining to a condition of a network entity from the corresponding network entity, and for those entities not capable of being contacted, inferring their status from the status of other communicating entities. The virtual network machine 17 maintains objects which include network data relating to the corresponding network entity and one or more inference handlers for processing the network data, the inference handlers being responsive to changes occurring in the same and/or a different object. The network data can then be transferred to the user interface 18 for supplying the network data to a user.

The user interface 18 may be resident on a computer that is different from the computer on which subsystem 16 and virtual network machine 17 reside. In such an arrangement, the user interface 18 may be referred to as a client, while the network interface and control subsystem 16 and the virtual network machine 17 may be referred to as a server. Several instances of the user interface 18 may exist for a single instance of the virtual network machine 17, so that several users may concurrently view different aspects of the networks being monitored by the network management system 10.

In one embodiment of the invention, the network interface and control subsystem 16 obtains data relating to the frame relay network 11 in accordance with the Simple Network Management Protocol (SNMP). SNMP is a standard that defines common messages and databases to support network management. A group known as the Internet Engineering Task Force (IETF) has established several standards in accordance with the SNMP framework, and in particular a standard known as a Management Information Base (MIB). The MIB specifies the data items that certain devices must maintain, other data items that are proprietary or optional, and the operations allowed on such devices. For example, the MIB specifies that Internet Protocol (IP) software must keep a count of all octets (8-bit bytes) that arrive over each network interface. Thus, a network management system is able to transmit a specific query (defined by the MIB) to a network interface device, and receive in response a message providing such count data stored within the network interface device's MIB. A document known as the IETF RFC (Request for Comments) 1315 defines a portion of the MIB for use with managing frame relay protocols.

RFCs such as RFC-1315 are available in both printed and electronic form. Printed copies may be obtained from Network Solutions, Inc., 505 Huntmar Park Drive, Herndon Va. 22070, while electronic copies may be accessed on the internet. In particular, an internet user may use an "anonymous" FTP to the host ds.internic.net (residing at 129.20.239.132) and retrieve the desired files from the directory "rfc/".

Figure 2:
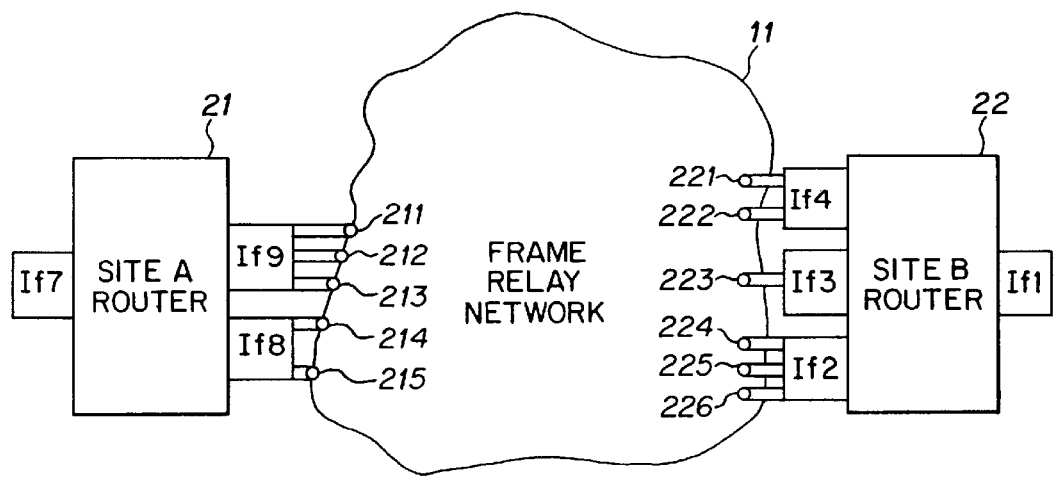
FIG. 2 is a block diagram of two devices which each interface with a frame relay network, such as the one shown in FIG. 1.

FIG. 2 illustrates detail of two interface devices, site A router 21, and site B router 22, each of which is coupled to the frame relay network 11. Each of routers 21 and 22 may have several interfaces. In particular, site A router 21 has interfaces If7, If8, and If9, while site B router 22 has interfaces If1, If2, If', and If4. Each of these interfaces are coupled to the frame relay network 11.

In order for a network management system to effectively monitor and accurately represent the frame relay network 11, it is desirable to determine which interfaces share a connection within the frame relay network. If two devices are performing routing or bridging, then the network management system 10 can infer a connection between two of the interfaces by reading the route tables or transparent bridge tables (defined within the MIB) of the interface devices 21 and 22. In the example shown in FIGS. 2 and 3, the interface devices 21 and 22 are routers that perform routing functions, and therefore the IP routing tables may be read by the network management system 10. Information relating to the IP routing tables is defined within the MIB, and is available from RFC documents such as MIB-II RFC-1213.

Figure 3:
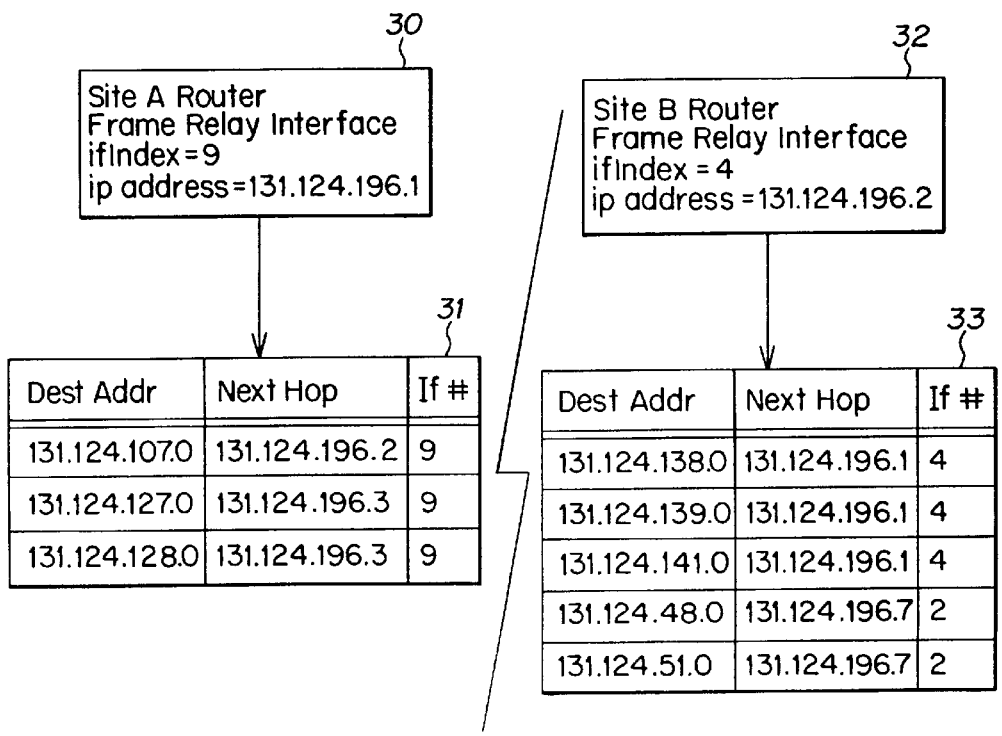
FIG. 3 shows data which may be obtained from the two devices of FIG. 2, in accordance with at least one network protocol standard.

In particular, FIG. 3 shows router information data 30 and routing table entries 31 for the site A router 21. The router information data 30 indicates that device 21 is a frame relay interface, and that information was requested pertaining to interface If9, which has an IP address of 131.124.196.1. The router table information 31 shows that there are three groups of destination addresses (e.g., subnets) for messages to be sent from interface If9, two of which had a next hop IP address of 131.124.196.3, and one of which had a next hop IP address of 131.124.196.2.

Similarly, router information data 32 relates to the site B router 22, and router table entries 33 contain information pertaining to interfaces If2 and If4 of the site B router 22. The router table information 33 shows that there are three groups of destination addresses (e.g., subnets) for messages to be sent from interface If4 with a next hop IP address of 131.124.196.1.

Because messages are to be sent from interface If9 to interface If4 (as indicated by the next hop IP address 131.124.196.2 in table 31 matching the IP address of interface If4), a network management system can infer that a frame relay connection exists between interface If9 and interface If4. This conclusion is further supported by the evidence that messages are to be sent from interface If4 to interface If9, as indicated by several of the next hop IP addresses in router table entries 33 (from interface If4) matching the IP address of interface If9 (131.124.196.1).

Thus, by determining the IP address of a message to be sent from an interface across a frame relay network, and then matching this IP address to the IP address of another interface on the frame relay network, a network management system can determine which two interfaces on a frame relay network share a connection. Similar results may be achieved by querying the transparent bridge tables if the two interface devices are performing bridge functions. The bridge MIB is defined in RFC-1493.

However, each interface may have several "channels", each communicating across a different connection within the frame relay network 11. For example, FIG. 2 shows that interface If9 has three channels 211, 212, and 213, interface If8 has two channels 214 and 215, interface If4 has two channels 221 and 222, interface If3 has one channel 223, and interface If2 has three channels 224, 225, and 226. Thus, even though it may be known which two interfaces share a connection within the frame relay network 11, it still may be uncertain which two channels of the two interfaces actually share the connection.

Figure 4:
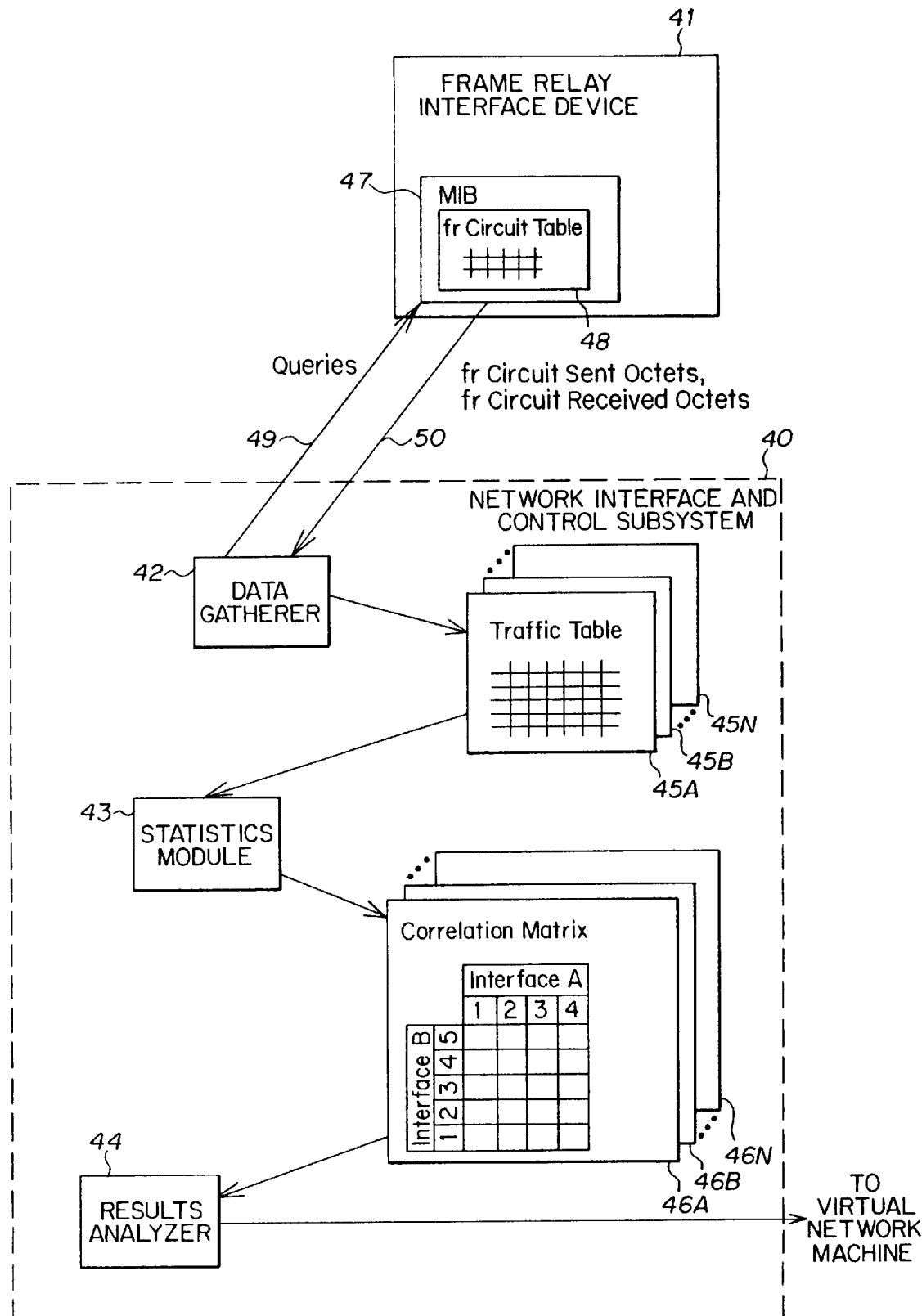
FIG. 4 is a block diagram of a network management system according to one embodiment of the invention, and a frame relay device which communicates therewith.

FIG. 4 is a block diagram showing operation of a system to determine the channels that share a frame relay connection. In particular, FIG. 4 depicts a network interface and control subsystem 40 which represents an embodiment of the network management and control subsystem 16 of FIG. 1. The subsystem 40 communicates with a frame relay interface device 41, which as described above, may be a router, switch, network interface card, or any device that communicates across a frame relay network (not shown in FIG. 4). The network interface and control subsystem 40 includes a data gatherer 42, a statistics module 43, and a results analyzer 44. Traffic tables 45A, 45B, . . . 45N are coupled between the data gatherer 42 and the statistics module 43, and correlation matrices 46A, 46B, . . . , 46N are coupled between the statistics module 43 and the results analyzer 44.

The results analyzer 44 is the portion of the network interface and control module that provides input to the virtual network machine, and the data gatherer 42 interfaces with the interface device 41. As described above, associated with the interface device 41 is a MIB 47. A portion of the MIB 47 is the frame relay circuit table (frCircuitTable) 48, as defined in RFC-1315. The data gatherer 42 communicates with the interface device 41 in the form of queries 49 which request information from the MIB 47, and in response the MIB 47 provides a count of octets sent by a particular channel of an interface of the interface device (frCircuitSent Octets), and a count of octets received by a particular channel of an interface of the interface device (frCircuitReceivedOctets), generally shown as 50 in FIG. 4.

Figure 5:
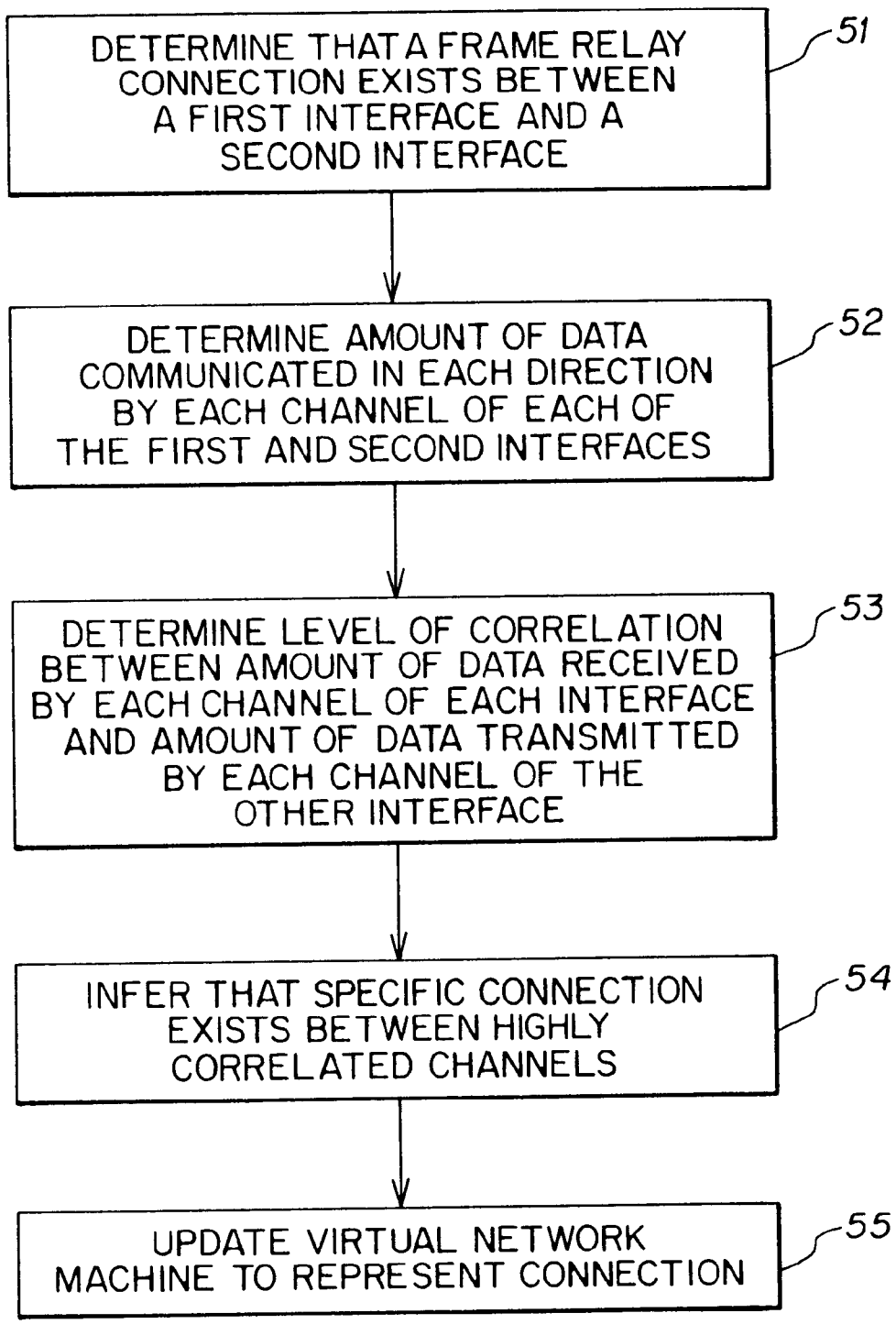
FIG. 5 is a process flow diagram showing steps of a process in accordance with an embodiment of the invention.

FIG. 5 is a high level process flow diagram of operations performed by an embodiment of the network interface and control subsystem 40. In step 51, the data gatherer 42 determines that a frame relay connection exists between a first interface and a second interface (e.g., interface If9 of site A router 21 and interface If4 of site B router 22). As discussed above, this determination may be made by analyzing the next hop address within a routing table, or by other methods known to those skilled in the art.

In step 52, the data gatherer 42 determines an amount of data that is communicated in each direction by each channel of the first and second interfaces. This step may include determining which channels are actually active (which may also be determined by querying the MIB 47), in which case any channels that are not active may be eliminated from consideration. Additionally, it is not necessary to determine the amount of data in both directions, although such analysis may result in a more complete solution as described in more detail below.

In one embodiment, the data gatherer 42 stores the data amounts in the appropriate traffic table 45. One of the traffic tables 45A may be for the analysis of a first interface, while another of the traffic tables 45B may be for the analysis of a second interface.

Once the amount of data has been determined, the statistics module 43 determines the level of correlation between data on each potential channel pair. A potential channel pair is made up of one channel from each interface for which a connection is known to exist. In particular, step 53 indicates that the level of correlation is determined between the amount of data received by each channel of each interface and the amount of data transmitted by each channel of the other interface. In the embodiment shown in FIG. 4, the correlation data is stored in one of the correlation matrices 46A–N (e.g., one for each interface pair). As shown in correlation matrix 46A, the matrix includes several rows for interface B, and several columns for interface A. Each row represents one channel on interface B, and each column represents one channel on interface A. Thus, each row-column intersection can store a correlation factor that relates the amount of data traffic on the interface B channel represented by the corresponding row, with the amount of data traffic on the interface A channel represented by the corresponding column. The statistics module 43 fills in the correlation matrix 46A with correlation factors derived from the traffic data stored in the traffic tables 45.

Once the correlation matrix 46A is populated, the results analyzer 44 evaluates the correlation factors to determine the channel of interface A and the channel of interface B that are communicating via the frame relay connection determined in step 51, more specifically by inferring that a specific connection exists between highly correlated channels (step 54). Once the specific connection is inferred, the results analyzer 44 may update the virtual network machine 17 to represent the connection (step 55).

Figure 6:
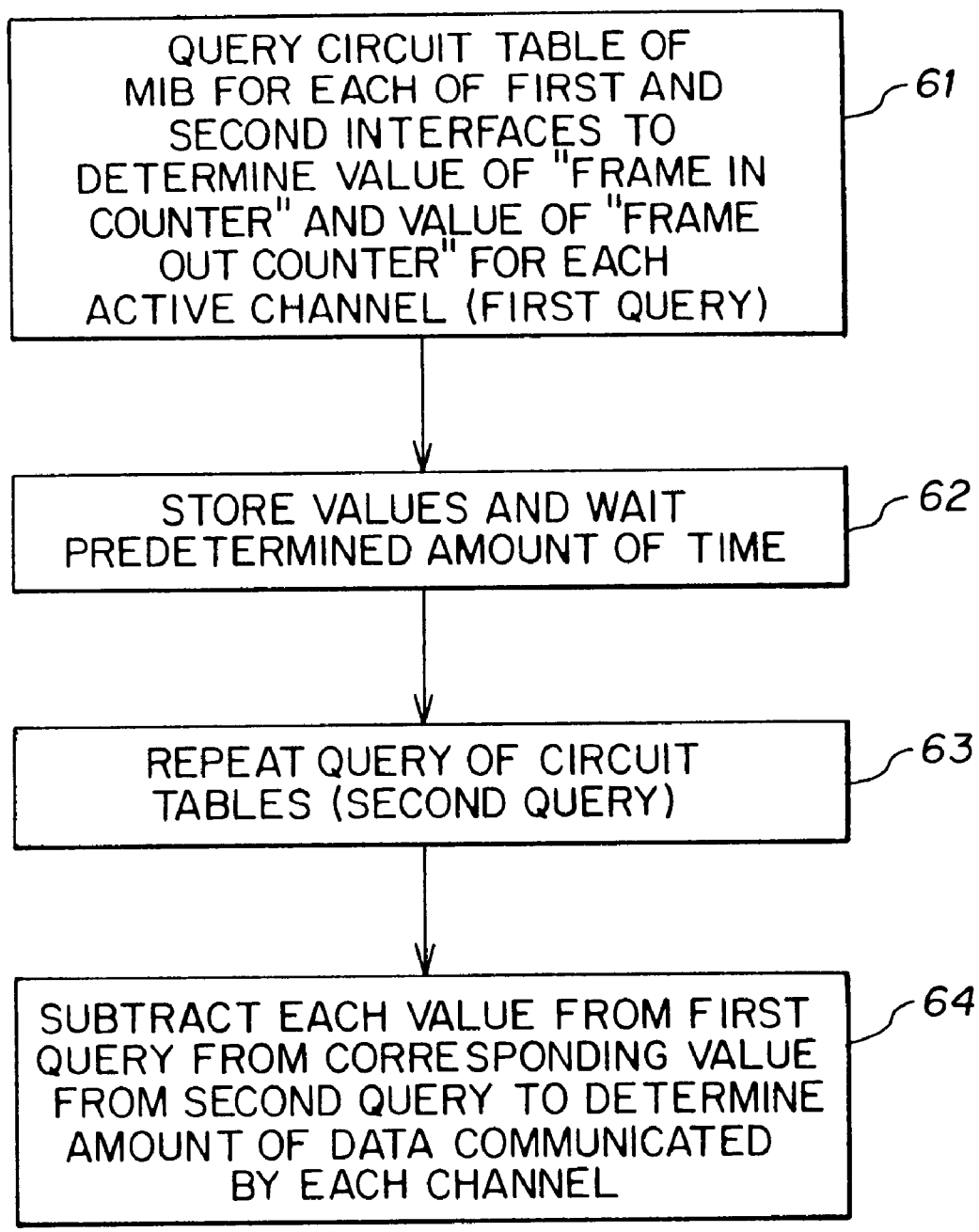
FIG. 6 is a flow diagram with greater detail of a portion of the process shown in FIG. 5.
Figure 7:
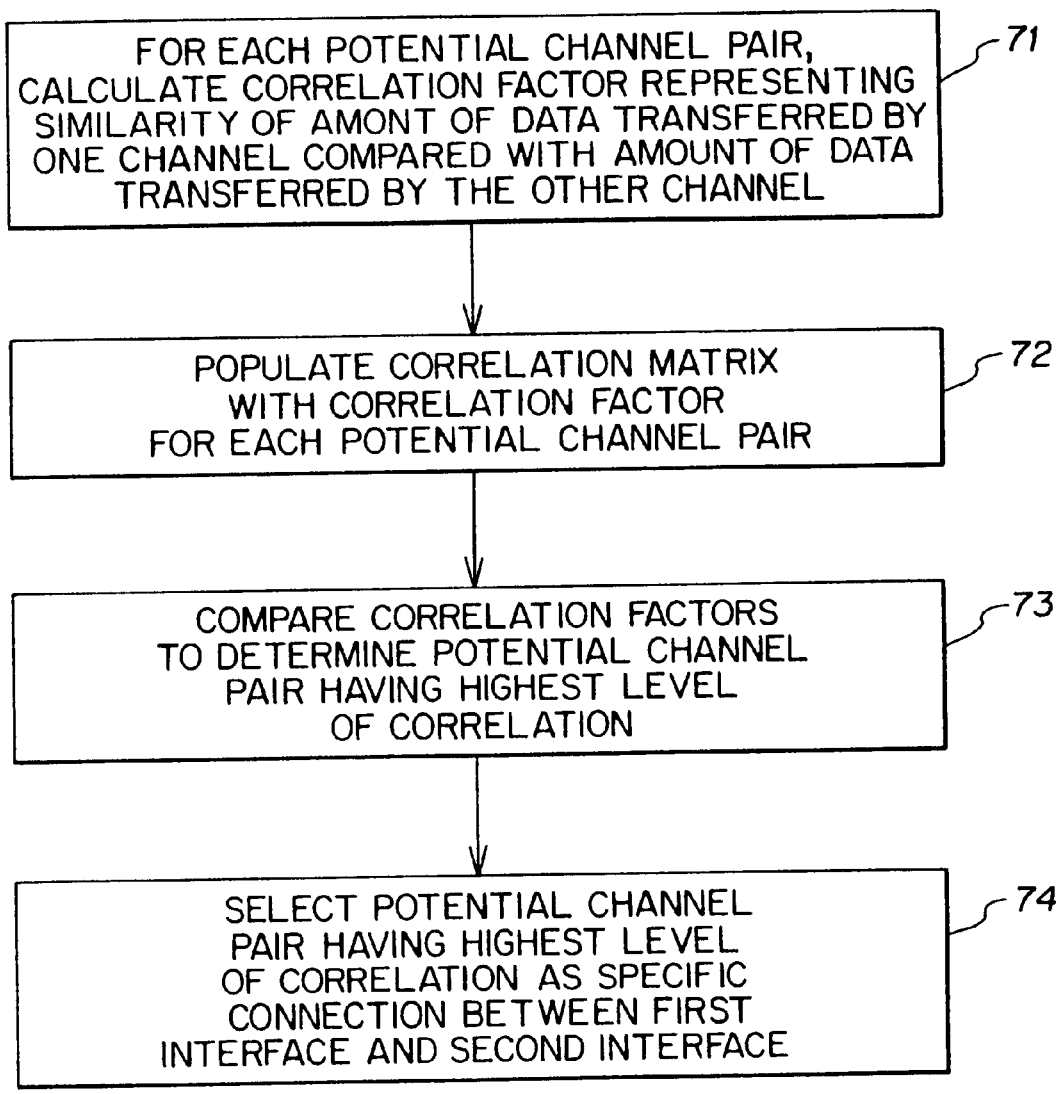
FIG. 7 is a flow diagram with greater detail of another portion of the process shown in FIG. 5.

FIG. 6 shows more detail of an implementation of step 52 of FIG. 5. In this implementation, the circuit tables of MIB 47 for each of the first and second interfaces are queried to determine the value of a "frame in counter" and a value of a "frame out counter" for each active channel (step 61). As shown in FIG. 4, one example of a "frame in counter" is the MIB variable frCircuitSentOctets, and an example of a "frame out counter" is the MIB variable frCircuitReceivedOctets. These variables each count the total number of octets (8-bit bytes) transmitted or received by a specific channel for which the MIB is queried, including network overhead associated with transferring the data. However, other data may be used to determine the amount of traffic or other relevant statistics, for example a variable that tracks the total number of frames transmitted or received, or a variable that tracks the total number of errors in transmitted or received data.

In step 62, the values of the "frame in counter" and the "frame out counter" are each stored, and a predetermined amount of time is allowed to pass. Once the predetermined amount of time has passed, the circuit tables are again queried to determine a new value of each of the "frame in counter" and the "frame out counter." Examples of a predetermined amount of time are 30 seconds, or 50 seconds, although highly correlated data may be obtained with even less or significantly more time. The reason that two queries are performed in some embodiments is that the counters of the circuit table typically count the data from the last time that the interface device was initialized. Thus, if the two interface devices were initialized at different times, the difference between the values from the first query and the values from the second query will account for the different initialization times.

In step 64, each value from the first query (step 61) is subtracted from a corresponding value from the second query (step 63), to determine the amount of data communicated by each channel in the amount of time used as a delay in step 62. The resulting values may be stored in traffic table 46A, an example of which is described in more detail below.

FIG. 8 shows more detail of an implementation of steps 53 and 54 of FIG. 5. In this implementation, for each potential channel pair, a correlation factor is calculated which represents the similarity of the amount of data transferred/received by one channel compared with the amount of data transferred/received by the other channel (step 71). In one embodiment, the correlation factor is calculated from the data transferred in both directions, as indicated in Equation (1):

$$CF_{1-2} = 100 - \frac{(abs(DeltaIn_1 - DeltaOut_2) + abs(DeltaOut_1 - DeltaIn_2)) * 100}{DeltaIn_1 + DeltaOut_1 + DeltaIn_2 + DeltaOut_2} \quad (1)$$

where:

"abs" is an absolute value function;

$DeltaOut_i$ represents a value from column 87 of FIG. 8 or column 97 of FIG. 9; and $DeltaIn_i$ represents a value from column 88 of FIG. 8 or column 98 of FIG. 9.

If the two channels for which the CF is calculated are connected, the absolute value of the difference between $DeltaIn_1$ and $DeltaOut_2$ and the absolute value of the difference between $DeltaOut_i$ and $DeltaIn_2$ would each ideally be zero, if the frame counters were accessed at precisely the same times. Thus, for ideal data transmission, the correlation factor CF would be equal to 100. However, it is likely that some differences will remain in these access times. The denominator of equation (1) accounts for the total amount of data transferred by the two channels; in this case, channel "1" and channel "2" for which the correlation factor "$CF_{1-2}$" is calculated. As indicated above, the correlation matrix 46 may then be populated with the correlation factor CF that is calculated for each potential channel pair (step 72).

Once the correlation matrix has been populated, then the correlation factors may be compared with one another to determine the potential channel pair that has the highest level of correlation (step 73). Once this comparison is performed, the potential channel pair having the highest level of correlation is selected as the specific frame relay connection that exists between the first interface and the second interface (step 74).

FIG. 8 shows a specific example of a traffic table 80, which contains eight columns, each populated with data. Column 81 ("Ifindex") identifies the interface for which queries have been performed, in this case interface If9. Column 82 ("DLCI") identifies the channel number within the interface. In this example, there are three active channels within interface If9: channel 31, channel 103, and channel 351.

Column 83 ("OutFrames-t0") stores the "frame out counter" value for each channel that resulted from the first query, while column 84 ("InFrames-t0") stores the "frame in counter" value for each channel that resulted from the first query. Similarly, column 85 ("OutFrames-t1") stores the "frame out counter" value for each channel that resulted from the second query, while column 86 ("InFrames-t1") stores the "frame in counter" value for each channel that resulted from the second query. From these values, the value for column 87 ("DeltaOut") may be determined by subtracting the value in column 83 from the value in column 85, for each channel. Similarly, the value for column 88 ("DeltaIn") can be determined by subtracting the value in column 84 from the value in column 86, for each channel. DeltaOut represents the amount of octets transmitted by the associated channel during the time interval between the two queries, while DeltaIn represents the number of octets received by the associated channel during this same time interval.

FIG. 9 is similar to FIG. 8, but represents an example of traffic data compiled for the channels 40 and 56 of interface If4. As in FIG. 8, column 91 identifies the interface, column 92 identifies the particular channel for which data has been gathered, columns 93 and 94 store the counter values from the first query, and columns 95 and 96 store the counter values from the second query. The values for columns 97 and 98 are then determined by subtraction from the earlier columns.

FIG. 10 shows a specific example of a correlation matrix 100 that contains two columns, one for each of the channels of interface If4 shown in FIG. 2. The correlation matrix 100 further contains three rows, one for each of the channels of interface If9 shown in FIG. 2. The correlation factors have been calculated from equation (1) using the data from FIGS. 8 and 9. For example, the correlation factor for the potential channel pair: channel 40 of interface If4, and channel 31 of interface If9, has been determined as:

$$CF_{31-40} = 100 - \frac{(\text{abs}(26{,}663 - 14{,}137) + \text{abs}(49{,}246 - 726)) * 100}{26{,}663 + 49{,}246 + 14{,}137 + 726} = 32 \quad (2)$$

In this example, the highest correlation factor is for the channel pair of channel 56 of interface If4 and channel 31 of interface If9, since 99 is the highest correlation factor value in the correlation table 100. Therefore, in this example, the virtual network machine 17 would be updated to represent that a specific frame relay connection exists between channel 31 and channel 56.

Generally, only a single connection will exist between any two interfaces, so the highest value of the correlation factor is selected. If two correlation factors are very close, however, this may be indicative of two specific channels. Such a situation may be resolved by determining the amount of data throughput supported by each of the two suspected channels as compared with the amount of data actually being transmitted across the frame relay network.

Although FIG. 4 shows a particular implementation of elements within the network interface and control subsystem 40, those skilled in the art will realize that other implementations are within the scope of the invention. For example, instead of tables or matrices, the appropriate data may be stored in any number of ways, and the functions of the data gatherer 42, the statistics module 43, and the results analyzer 44 may be re-allocated to a different combination of modules.

The embodiments of the network management system described herein may also be implemented in specially-designed hardware such as a state machine or other digital circuitry, or in any of several programming languages on a general purpose computer, or as a programmed general purpose computer itself.

For example, elements of the network management system shown in FIG. 4 may be implemented as software on a floppy disk, compact disk, or hard drive, which controls a computer, for example a general purpose computer such as a workstation, a mainframe or a personal computer, to perform steps of the disclosed processes or to implement equivalents to the disclosed block diagrams. Such a general purpose computer typically includes a central processing unit (CPU) coupled to random access memory (RAM) and program memory via a data bus. The general purpose computer may be connected to the monitored networks in order to interface with other elements, and may provide commands to devices on the network in order to control the network configuration.

Alternatively, the elements of the embodiments described herein may be implemented as special purpose electronic hardware. Additionally, in either a hardware or software embodiment, the functions performed by these different elements may be combined in varying arrangements of hardware and software. For example, in at least one embodiment of the invention, the portions of the network interface and control shown in FIG. 4 are supplied as a separate software package known as a "Management Module," which may be purchased and integrated with an existing instance of the Spectrum Network Management System.

Having thus described at least one illustrative embodiment of the invention, various modifications and improvements will readily occur to those skilled in the art and are intended to be within the scope of the invention. Accordingly, the foregoing description is by way of example only and is not intended as limiting.

What is claimed is:

1. A method for identifying a frame relay connection in a frame relay network, the method comprising the steps of:

identifying a first plurality of channels of a first interface and a second plurality of channels of a second interface that relate to a frame relay connection between the first and second interfaces;

selecting, as an identifier of the frame relay connection, a first channel from the first plurality of channels and a second channel from the second plurality of channels based upon a relative amount of data transferred on each of the first and second channels; and identifying, based on said identifier, a frame relay connection in the frame relay network.

2. The method of claim 1, including the step of determining an amount of data transferred by each of the first plurality of channels and each of the second plurality of channels; and wherein the step of selecting includes determining the relative amount of data based upon the amount of data transferred by each of the first plurality of channels and each of the second plurality of channels.

3. The method of claim 1, wherein the step of identifying the first plurality of channels and the second plurality of channels includes determining that a connection exists between an interface of a first interface device that is coupled to the frame relay network, and an interface of a second interface device that is coupled to the frame relay network;

wherein the interface of the first interface device includes the first plurality of channels, and the interface of the second interface device includes the second plurality of channels.

4. A method for identifying a frame relay connection in a network, the method comprising the steps of:

identifying a first plurality of channels of a first interface and a second plurality of channels of a second interface that relate to a frame relay connection between the first and second interfaces; and selecting, as an identifier of the frame relay connection, a first channel from the first plurality of channels and a second channel from the second plurality of channels based upon a relative amount of data transferred on each of the first and second channels wherein the selecting step includes identifying a plurality of different potential pairs of channels, each potential pair including one of the first plurality of channels and one of the second plurality of channels;

determining a plurality of correlation factors, each correlation factor relating to a respective one of the potential pairs of channels; and determining which of the correlation factors has a best value with respect to others of the correlation factors, in order to determine which of the potential pairs of channels has a best correlation factor.

5. The method of claim 4, wherein the step of determining the corrlation factor includes determining an amount of similarity between an amount of data transmitted by the one of the first plurality of channels and an amount of data received by the one of the second plurality of channels during a period of time.

6. The method of claim 5, wherein the step of determining the correlation factor further includes determining the between an amount of data received by the one of the first plurality of channels and an amount of data transmitted by the one of the second plurality of channels during the period of time.

7. A method for identifying a frame relay connection in a network, the method comprising the steps of:

identifying a first plurality of channels of a first interface and a second plurality of channels of a second interface that relate to a frame relay connection between the first and second interfaces;

determining an amount of data transferred by each of the first plurality of channels and each of the second plurality of channels; and selecting, as an identifier of the frame relay connection, a first channel from the first plurality of channels and a second channel from the second plurality of channels based upon a relative amount of data transferred on each of the first and second channels;

wherein the step of selecting includes determining the relative amount of data based upon the amount of data transferred by each of the first plurality of channels and each of the second plurality of channels;

wherein the step of determining, for one channel of the first plurality of channels that resides on a first interface device of the frame relay network, includes:

querying the first interface device to determine a first amount of data that has been transferred on the one channel as of a first time;

querying the first interface devices to determine a second amount of data that has been transferred on the one channel as of a second time; and determining a difference between the first and second amounts of data in order to determine the amount of data being transferred by the one channel.

8. A method for identifying a frame relay connection in a frame relay network, the method comprising the steps of:

identifying a first plurality of channels of a first interface and a second plurality of channels of a second interface that relate to a frame relay connection between the first and second interfaces;

selecting, as an identifier of the frame relay connection, a first channel from the first plurality of channels and a second channel from the second plurality of channels based upon a relative amount of data transferred on each of the first and second channels; and identifying, based on said identifier, a frame relay connection in the frame relay network, wherein the step of identifying includes determining that a connection exists between an interface of a first interface device that is coupled to the frame relay network, and an interface of a second interface device that is coupled to the frame relay network;

wherein the interface of the first interface device includes the first plurality of channels, and the interface of the second interface device includes the second plurality of channels; and wherein said determining includes comparing an address of the first interface with a destination address of data transmitted by the second interface.

9. An apparatus for identifying a frame relay connection in a frame relay network, the apparatus comprising:

means for identifying a first plurality of channels of a first interface and a second plurality of channels of a second interface that relate to a potential frame relay connection between the first and second interfaces;

means for selecting a first channel from the first plurality of channels and a second channel from the second plurality of channels based upon a relative amount of data transferred on each of the first and second channels, to identify the frame relay connection; and means for identifying the frame relay connection in the frame relay network.

10. The apparatus of claim 9, wherein the means for identifying first plurality of channels and a second plurality of channels includes means for determining that a connection exists between an interface of a first interface device that is coupled to the frame relay network, and an interface of a second interface device that is coupled to the frame relay network;

wherein the interface of the first interface device includes the first plurality of channels, and the interface of the second interface device includes the second plurality of channels.

11. The apparatus of claim 10, wherein the means for determining includes means for comparing an address of the first interface with a destination address of data transmitted by the second interface.

12. The apparatus of claim 9, including means for determining an amount of data transferred by each of the first plurality of channels and each of the second plurality of channels;

wherein the means for selecting includes means for determining the relative amount of data based upon the amount of data transferred by each of the first plurality of channels and each of the second plurality of channels.

13. An apparatus for identifying a frame relay connection in a network, the apparatus comprising:

means for identifying a first plurality of channels of a first interface and a second plurality of channels of a second interface that relate to a potential frame relay connection between the first and second interfaces; and means for selecting a first channel from the first plurality of channels and a second channel from the second plurality of channels based upon a relative amount of data transferred on each of the first and second channels, to identify the frame relay connection;

wherein the means for selecting includes:

means for identifying a plurality of different potential pairs of channels, each potential pair including one of the first plurality of channels and one of the second plurality of channels;

means for determining a plurality of correlation factors, each correlation factor relating to a respective one of the potential pairs of channels; and means for determining which of the correlation factors has a best value with respect to others of the correlation factors, in order to determine which of the potential pairs of channels has a best correlation factor.

14. The apparatus of claim 13, wherein the means for determining the correlation factor includes means for determining an amount of similarity between an amount of data transmitted by the one of the first plurality of channels and an amount of data received by the one of the second plurality of channels during a period of time.

15. The apparatus of claim 14, wherein the means for determining the correlation factor further includes means for determining the amount of similarity between an amount of data received by the one of the first plurality of channels and an amount of data transmitted by the one of the second plurality of channels during the period of time.

16. An apparatus for identifying a frame relay connection in a network, the apparatus comprising:

means for identifying a first plurality of channels of a first interface and a second plurality of channels of a second interface that relate to a potential frame relay connection between the first and second interfaces;

determining an amount of data transferred by each of the first plurality of channels and each of the second plurality of channels; and means for selecting a first channel from the first plurality of channels and a second channel from the second plurality of channels based upon a relative amount of data transferred on each of the first and second channels, to identify the frame relay connection;

wherein the means for selecting includes means for determining the relative amount of data based upon the amount of data transferred by each of the first plurality of channels and each of the second plurality of channels;

wherein the means for determining, for one channel of the first plurality of channels that resides on a first interface device of the frame relay network, includes:

means for querying the first interface device to determine a first amount of data that has been transferred on the one channel as of a first time;

means for querying the first interface devices to determine a second amount of data that has been transferred on the one channel as of a second time; and means for determining a difference between the first and second amounts of data in order to determine the amount of data being transferred by the one channel.

17. An apparatus for identifying a frame relay connection in a frame relay network, the apparatus comprising:

a data module, coupled to the network, having an output that provides an indication of a first plurality of channels and a second plurality of channels that relate to a potential frame relay connection;

a results analyzer, having an input coupled to the output of the data module, the results analyzer selecting a first channel from the first plurality of channels and a second channel from the second plurality of channels based upon a relative amount of data transferred by each of the first and second channels, to identify the frame relay connection; and means for identifying the frame relay connection in the frame relay network.

18. The apparatus of claim 17, wherein the indication of the first plurality of channels and the second plurality of channels includes a plurality of different potential pairs of channels, each of the potential pairs including one of the first plurality of channels and one of the second plurality of channels.

19. An apparatus for identifying a frame relay connection in a network, the apparatus comprising:

a data module, coupled to the network, having an output that provides an indication of a first plurality of channels and a second plurality of channels that relate to a potential frame relay connection, wherein the indication of the first plurality of channels and the second plurality of channels includes a plurality of different potential pairs of channels, each of the potential pairs including one of the first plurality of channels and one of the second plurality of channels;

a results analyzer, having an input coupled to the output of the data module, the results analyzer selecting a first channel from the first plurality of channels and a second channel from the second plurality of channels based upon a relative amount of data transferred by each of the first and second channels, to identify the frame relay connection; and a statistics module, coupled between the output of the data module and the input of the results analyzer, the statistics module determining a plurality of correlation factors, each correlation factor relating to a respective one of the potential pairs of channels.

20. The apparatus of claim 19, wherein the results analyzer determines which of the plurality of correlation factors has a best value with respect to others of the plurality of correlation factors, to determine which of the plurality of potential pairs of channels has a best correlation factor.

21. The apparatus of claim 19, wherein the statistics module determines a correlation factor between one of the first plurality of channels and one of the second plurality of channels, the correlation factor being proportional to an amount of similarity between an amount of data transmitted by the one of the first plurality of channels and an amount of data received by the one of the second plurality of channels during a period of time.

22. The apparatus of claim 21, wherein the correlation factor is further proportional to the amount of similarity between an amount of data received by the one of the first plurality of channels and the amount of data transmitted by the one of the second plurality of channels during the period of time.

23. An apparatus for identifying a frame relay connection in a network, the apparatus comprising:

a data module, coupled to the network, having an output that provides an indication of a first plurality of channels and a second plurality of channels that relate to a potential frame relay connection, wherein the data module determines an amount of data transferred by each of the first plurality of channels and each of the second plurality of channels;

a results analyzer, having an input coupled to the output of the data module, the results analyzer selecting a first channel from the first plurality of channels and a second channel from the second plurality of channels based upon a relative amount of data transferred by each of the first and second channels, to identify the frame relay connection; and a statistics module, coupled between the data module and the results analyzer, the statistics module determining the relative amount of data based upon the amount of data transferred by each of the first plurality of channels and each of the second plurality of channels.

24. The apparatus of claim 23, wherein the data module determines the amount of data being transferred by one channel of the first plurality of channels based upon a difference between an amount of data that has been transferred by the one channel as of a first time, and an amount of data that has been transferred by the one channel as of a second time.

25. A network management system for monitoring a frame relay network including:

a data module, coupled to the network, constructed and arranged to provide a plurality of different potential pairs of channels that relate to a potential frame relay connection, wherein each of the potential pairs includes one of a first plurality of channels and one of a second plurality of channels;

a results analyzer including an input coupled to an output of the data module, the results analyzer being constructed and arranged to select from the plurality of different potential pairs a first channel, from the first plurality of channels, and a second channel, from the second plurality of channels, based upon a relative amount of data transferred by each of the first and second channels, to identify the frame relay connection; and a user interface constructed and arranged to receive from said results analyzer the identified frame relay connection in the frame relay network and constructed and arranged to enable a user to monitor the identified frame relay connection.

26. The network management system of claim 25 comprising a statistics module coupled between the data module and the results analyzer, the statistics module being constructed and arranged to determine the relative amount of data based upon the amount of data transferred by each of the first plurality of channels and each of the second plurality of channels.

* * * * *